Jan. 31, 1961 W. W. ANDERSON, JR 2,970,183
CABLE SUPPORT
Filed Nov. 12, 1957
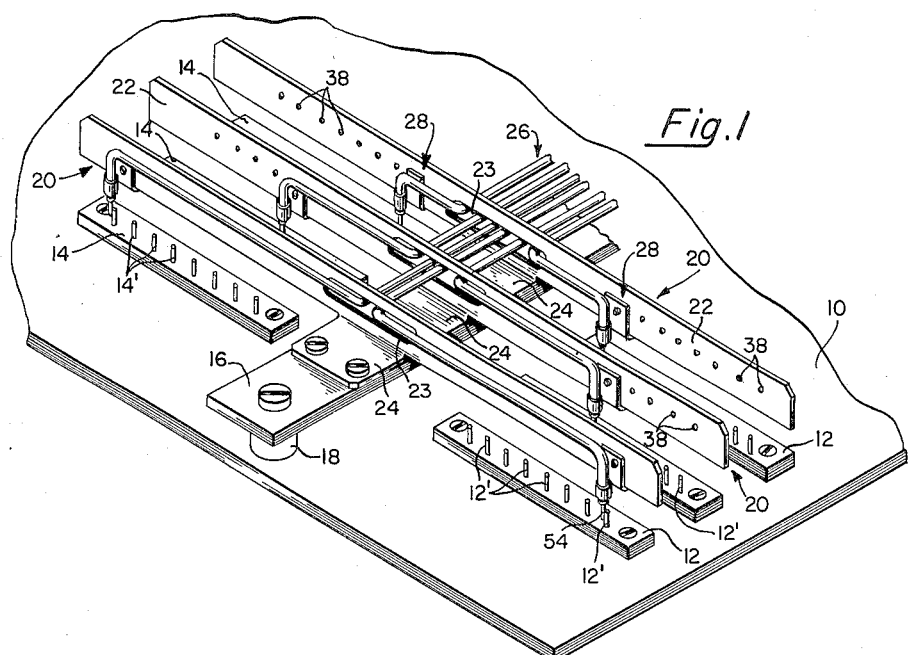
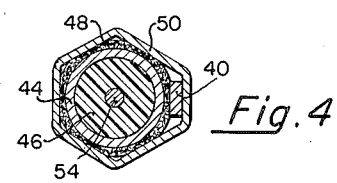
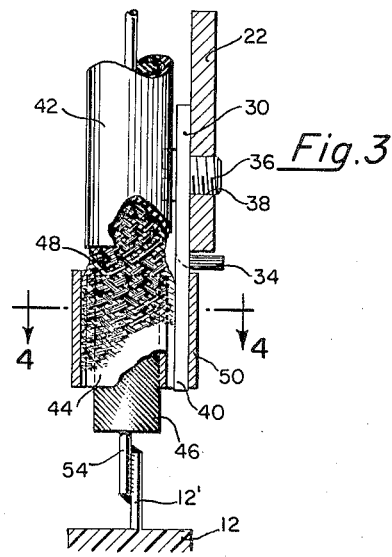
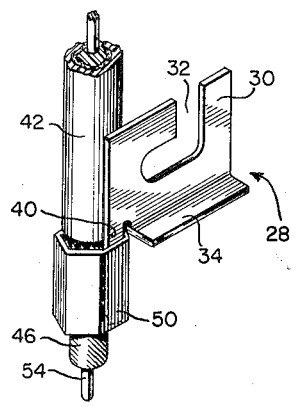
INVENTOR.
WILLIAM W. ANDERSON, JR.
BY
AGENT United States Patent Office 2,970,183
Patented Jan. 31, 1961

2,970,183
CABLE SUPPORT
William W. Anderson, Jr., Ridley Park, Pa., assignor to Burroughs Corporation, Detroit, Mich., a corporation of Michigan
Filed Nov. 12, 1957, Ser. No. 695,946
5 Claims. (Cl. 174—78)

This invention relates generally to conductive cables and supports therefor, and more particularly to cable end mountings and apparatus for routing cables on connector panels.

While not limited thereto, the invention finds special application in routing and supporting coaxial cables on multi-package connector panels and serves to provide a cable arrangement ideally suited for connector panel assembly.

Heretofore, the assembly of coaxial cables on multi-package connector panels has been attended by some difficulty due to the problem of routing such cables in and around other adjacent wiring. In addition to the routing problem, there has also been present the undesirable strain imposed upon connector pins to which such cables are attached since the pins have had to support the weight of the cable at the cable end.

An object of the invention is to provide apparatus for routing and supporting cables in compatability with adjacent wiring on connector panels.

Another object of the invention is to provide means for eliminating the strain on connector pins caused by the cables connected thereto.

A more specific object is to provide a cable end mounting for coaxial cables which will permit terminating the shielding in close proximity to the terminal pin on standard connectors.

These and other objects will become more apparent from the following detailed description of a specific embodiment of the invention when read in conjunction with the accompanying drawings in which:

Fig. 1 is a fragmentary view in perspective of one form of apparatus constructed in accordance with the present invention;

Fig. 2 is an enlarged detail of one of the cable ends and cable mounting clips shown in Fig. 1;

Fig. 3 is an enlarged detail, partly in section and with parts broken away to show the details of assembly of a cable end and its mounting clip; and Fig. 4 is a sectional view taken on line 4—4 of Fig. 3.

Briefly described, and as shown in the illustrated embodiment of the invention, there is provided means for supporting a trunk of cables, preferably arranged in side by side relationship, a spaced distance above an associated connector panel. The supporting means enables the individual cables of the trunk to be routed outwardly therefrom in fan style to be terminated at appropriate connectors on a connector panel and, preferably, without overlapping or interference of one cable with another. At the terminal ends of the cables, means are provided for mounting the cables to the supporting means at a position thereon closely adjacent to the associated connector pins. The means for mounting the cable ends to the supporting means serves to rigidly support the cables and may also provide a ground connection therefor, if desired.

Referring to Fig. 1 of the drawings, 10 represents a multi-package connector panel having mounted thereon two rows of connectors 12 and 14 respectively. Mounted above panel 10 and secured thereto between the two rows of connectors 12 and 14 is a bus bar 16 spaced from panel 10 by means of insulators 18. Bus bar 16 serves as a common ground for the two rows of connectors 12 and 14, and supports a plurality of conductive fan strips 20 securely mounted on its upper surface. When viewed from a point above panel 10, each fan strip 20 is seen to be T-shaped in form, and consists of an elongated arm 22 and a forwardly extending short leg 24 by means of which the fan strip is secured to bus bar 16. As shown, arms 22 extend over connectors 12 and 13 as cantilever booms.

Each of the arms 22 is provided at its medial portion with an elongated slot 23 extending therethrough which serves as a guide for forming a trunk of coaxial cables 26 across panel 10. At the appropriate locations, each cable is fanned out from the trunk 26 so that it is parallel and adjacent to arm 22 of a fan strip 20 and its terminal end is bent downwardly and positioned over the appropriate connector pin 12' or 14' respectively.

The terminal ends of the cables are fitted with conductive mounting clips 28 (Fig. 2) for securing the cable ends to arms 22. Each clip 28 comprises a rectangular portion 30 having an L-shaped slot 32 therein to facilitate securing the cable end assembly to arm 22 by means of a screw 36 (Fig. 3) engaging an appropriate tapped hole 38 in arm 22. The lower margin of clips 28 is formed with a flange 34 which engages the lower edge of arm 22 and serves to maintain the cable end assembly against any rocking motion when it is secured to arm 22, while the left margin of clips 28 (Fig. 2) extends downwardly to form an elongated leg 40 (see also Figs. 3 and 4) by means of which the clips are attached to the respective cable ends in a manner now to be described.

To secure clips 28 to the cable ends, the ends are first prepared by stripping off a suitable length of the outer jacket 42 and inserting an inner sleeve 44 between the insulation 46 and the cable shielding 48. An outer sleeve 50 is then slid over the shielding 48, and the clip 28 is joined to the cable end by inserting leg 40 of the clip between the shielding 48 and outer sleeve 50. The cable end assembly is then firmly secured together, as by crimping or swaging.

Inner sleeve 44 and outer sleeve 50 (which is cylindrical prior to swaging) are ground sheath connectors known in the art, and are shown illustratively as used in one method of cable termination. Any suitable method of termination may be used, provided that leg 40 of clip 28 is secured to the cable to provide good electrical contact with the shielding and substantial mechanical support.

The cable ends are secured to arms 22, as mentioned previously, by choice of the appropriate tapped hole 38 in arms 22 so that the center conductors 54 of the cables will be positioned closely adjacent to the appropriate connector pins 12' or 14' respectively. In such position, the conductors 54 are soldered to the connector pins or attached thereto in any suitable manner.

When all the cables have been routed and terminated as described above, the cabling may be dressed by drawing out the slack and seizing the cables to the bus bar or fan strip structures with lacing twine or by other suitable means.

While adjacent wiring and other components have not been shown in the drawings for purposes of clarity, it will be apparent to those skilled in the art that the arrangement and construction of the fan strips afford a means for routing coaxial cables on multi-package connector panels in compatability with such wiring and components, and that connector panel apparatus may be assembled with greater efficiency and ease than heretofore possible. Furthermore, increased accessibility to the connector pins is provided, thereby promoting a more efficient utilization of the pins and permitting tighter or more compact packaging to be effected per unit connector.

In addition to their functions of supporting and routing the cables, the fan strips serve as conductors to ground for the cable shielding by reason of their mounting on the ground bus bar in conductive relation therewith.

The mounting clip is used in lieu of the pig-tail or jumper wire which is commonly employed to terminate the shielding of a coaxial cable to ground, since it offers the advantage of rigidly supporting the cable; and additionally its arrangement permits the shielding to be terminated in close proximity to the appropriate connector pin and thus expose a minimum amount of unshielded cable.

While the invention has been described with reference to a specific embodiment thereof, it will be apparent to those skilled in the art that the invention may be constructed in various forms. Accordingly, it is to be understood that the invention as herein shown and described is to be taken as a preferred embodiment of the same, and that various changes in size, shape, and arrangement of parts may be resorted to without departing from the spirit of the invention, or the scope of the subjoined claims.

What is claimed is:

1. In electrical apparatus and the like having a panel and a plurality of connectors mounted thereon for terminal connection of cables, cable support apparatus comprising, a plurality of elements each having an aperture therein for forming and guiding a trunk of cables along said panel in an elevated position and each having a cantilever boom extending over at least one of said connectors in an elevated position thereabove, each of said cables being fanned out from said trunk through the aperture of one of said elements and routed along the cantilver boom of said element to a respective one of said connectors and mounting clips for attaching the terminal ends of said cables at places on the respective cantilver booms adjacent to and above the respective connectors.

2. In electrical apparatus and the like having a panel and a plurality of connectors mounted thereon for terminal connection of coaxial cables, apparatus for supporting said cables comprising, grounded conductive means for forming a trunk of said cables in an elevated position above said panel and for routing individual ones of said cables along said panel and said conductive means in said elevated position to respective ones of said connectors, and conductive mounting clips secured to the terminal ends of said cables in conductive contact with the shielding thereof for rigidly attaching said terminal ends to said grounded conductive means at places on the latter adjacent to and above the respective connectors.

3. In electrical apparatus and the like having a panel and a plurality of connectors mounted thereon for terminal connection of coaxial cables, apparatus for supporting said cables comprising, a plurality of grounded conductive elements each having an aperture therein for forming and guiding a trunk of said cables along said panel in an elevated position and each having a cantilever boom extending over at least one of said connectors in an elevated position thereabove, each of said cables being fanned out from said trunk through the aperture of one of said elements and routed along the cantilever boom of said element to a respective one of said connectors, and conductive mounting clips secured to the terminal ends of said cables in conductive contact with the shielding thereof for rigidly attaching said terminal ends to said grounded conductive elements at places on the latter adjacent to and above the respective connectors.

4. A coaxial cable assembly comprising, in combination, a panel, a row of connectors mounted on said panel, a ground bus insulated from said panel and mounted at an elevated position thereabove, a plurality of conductive elements mounted on said bus and each having an aperture therein for forming and guiding a trunk of coaxial cables along said panel in an elevated position, each of said elements having a cable mounting portion located at an elevated position above said connectors, each of said cables being fanned out from said trunk through the aperture of one of said elements and routed along the mounting portion of said element to a respective one of said connectors, and conductive mounting clips secured to the terminal ends of said cables in conductive contact with the shielding thereof for rigidly attaching said terminal ends to said mounting portions at places on the latter adjacent to and above the respective connectors.

5. A coaxial cable assembly comprising in combination, a panel, a row of electrical connectors mounted on said panel and having conductive terminal pins, a grounded bus insulated from said panel and mounted at an elevated position thereabove, a plurality of conductive elements mounted on said bus in spaced-apart relation and having aligned apertures therein for progressively forming and guiding a trunk of coaxial cables along the panel in an elevated position, each of said elements having a cantilever boom portion extending laterally of said trunk and located at an elevated position above said connectors and panel, said boom being provided with a series of mounting holes disposed at substantially equal distances from said panel, each of said cables being fanned out from said trunk through the aperture of one of said elements and routed along the respective boom to one of said connectors, and conductive mounting clips secured to the terminal ends of said cables and in conductive contact with the shielding thereof for attaching said terminal ends at selected ones of said holes above the respective terminal pins of said connectors, whereby said terminal ends are rigidly suspended above said panel in close or abutting relation to the terminal pins of said connectors for connection thereto.

References Cited in the file of this patent

UNITED STATES PATENTS

| | | |
|---|---|---|
| 2,098,321 | Treptow | Nov. 9, 1937 |
| 2,107,751 | Goff | Feb. 8, 1938 |
| 2,166,420 | Robertson | July 18, 1939 |
| 2,434,918 | Gall | Jan. 27, 1948 |
| 2,798,113 | Koller et al. | July 2, 1957 |

FOREIGN PATENTS

| | | |
|---|---|---|
| 555,745 | Great Britain | Sept. 6, 1943 |